United States Patent [19]
Hausser

[11] 3,798,532
[45] Mar. 19, 1974

[54] ELECTRON DOUBLE RESONANCE SPECTROMETER WITH A MICROWAVE CAVITY BRIDGE ARRANGEMENT

[76] Inventor: Karl Hausser, Neuenheimer Landstr. 72, 69 Heidelberg, Germany

[22] Filed: June 15, 1971

[21] Appl. No.: 153,344

Related U.S. Application Data
[63] Continuation-in-part of Ser. No. 804,553, March 5, 1969, abandoned.

[30] Foreign Application Priority Data
Mar. 5, 1968  Germany............................ 1698223

[52] U.S. Cl. ............................... 324/0.5 R, 333/83
[51] Int. Cl. ........................................... G01n 27/78
[58] Field of Search ..... 324/0.5 A, 0.5 AC, 0.5 AH; 333/83

[56] References Cited
UNITED STATES PATENTS
3,372,331   3/1968   Larson............................ 324/0.5 R OTHER PUBLICATIONS
Acadamie Des Sciences, Comptes Rendus, 246 (12), 3/58, pp. 1833–1835.

P. R. Moran – Electron Spin Double Resonance of F Centers in KCL. I – Phys. Rev. 135(1A) pp. A247-A251 relied on 7/6/67.

Primary Examiner—Michael J. Lynch
Attorney, Agent, or Firm—Alfred W. Breiner

[57] ABSTRACT

In a spectrometer for measuring electron spin resonances a microwave cavity resonator is excited in a TEM mode such that the direction of the magnetic component of the microwave field is perpendicular to the direction of the magnetic component of a microwave field introduced in the cavity resonator by a helix giving broadband characteristics without tuning. A sample under test may be inserted in the helix for reaction by both the magnetic components of the microwave fields of the resonator and of the helix without interference. A spectrometer system is arranged to provide output spectrum from measurement of samples in the electron-electron double resonance mode, as well as in other modes.

7 Claims, 4 Drawing Figures

PATENTED MAR 19 1974  3,798,532

10 MHz

INVENTOR,
KARL HAUSSER

ELECTRON DOUBLE RESONANCE SPECTROMETER WITH A MICROWAVE CAVITY BRIDGE ARRANGEMENT

This is a continuation-in-part of the co-pending U. S. application Ser. No. 804,553, filed Mar. 5, 1969, by Karl H. Haussner, now abandoned based upon a German application P 1,698,223.3 filed Mar. 5, 1968.

This invention relates to spectrometer equipment for measuring electron spin resonances; and, more particularly, to microwave equipment for measuring electron spin resonances.

For measurements of the nuclear magnetic resonance, it is known to apply an orthogonal arrangement of the induction coils of two resonance circuits in the radio frequency region up to several hundred MHz. Several examples of this arrangement known by the name of "Bloch head" are the essential elements in constructing NMR spectrometers (Ref.: F. Bloch, W. W. Hansen, and M. E. Packard, Phys. Rev. 70, 474 (1946); A. Lösche, Kerninduktion, Kap. 3, VEB Deutscher Verlag der Wissenschaften, Berlin 1967). It is a well-known fact, however, that the application of induction coils is not possible in the microwave region. Therefore, instead of resonance circuit in the radio frequency region, a cavity is primarily used in the microwave region, for instance for measuring electron spin resonances (Ref.: C. P. Poole, Electron Spin Resonance, Chapter 8, Interscience Publishers 1967; D. J. Ingram, Spectroscopy at Radio and Microwave Frequencies, Chapter 3, Butterworth 1967). Delay lines, for instance in the form of a helix, have also been used instead of cavities (Ref.: R. H. Webb, Rev. Sci. Instr. 33, 732 (1962); ibid. 38, 1264 (1967)).

The present invention is directed to an apparatus for measuring electron spin resonances which contains an orthogonal, completely decoupled arrangement of a cavity and a delay line in the form of a helix. Such an apparatus permits the following measurements to be carried out with only one probe:

1. Electron spin resonance in cw-operation
2. Electron spin resonance by pulse technique
3. Electron electron spin double resonance and, as the helix can also be used as an induction coil in the radio frequency region:
4. Electron nuclear double resonance
5. Electron electron nuclear triple resonance, and
6. Dynamic nuclear polarization. Thus, the construction of a universal spectrometer suited for all such measurements is possible.

The above and other objects, features, and advantages of the present invention will become apparent from a consideration of the following detailed description of a preferred embodiment thereof, especially when taken in conjunction with the accompanying drawings, in which.

Figure 1:
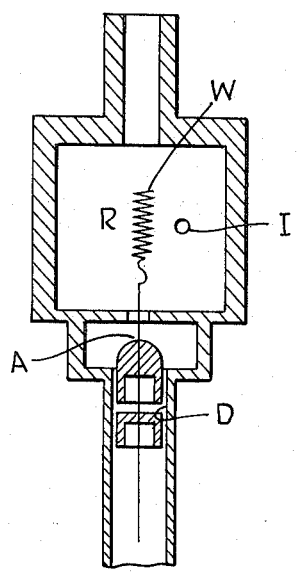
FIG. 1 is a cross-sectional view of the apparatus of the invention taken along a plane containing the axis of the microwave cavity.
Figure 2:
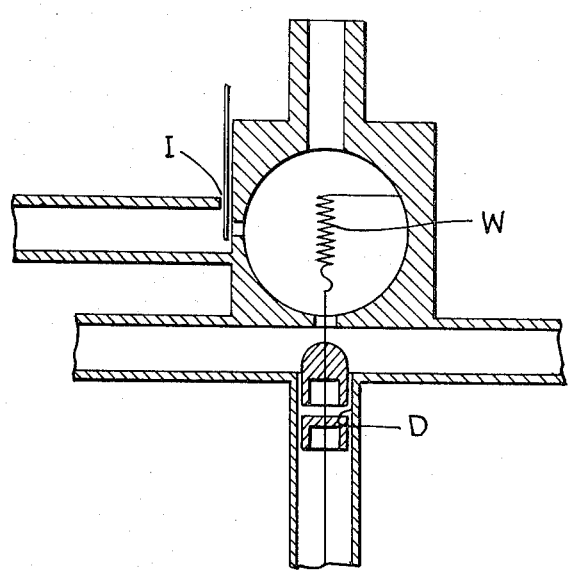
FIG. 2 is a cross-sectional view of the apparatus of FIG. 1 taken along a plane perpendicular to the plane of FIG. 1 and also containing the axis of the microwave cavity.

In the drawing FIGS. 1 and 2 show two cuts, perpendicular to each other, through a probe in accordance with the invention. More specifically, a cylindrical cavity R is chosen to be of such dimensions that the $H_{102}$-mode is excited. The dimensions (scale 2:1) are based on a frequency of 24 GHz corresponding to a wave length of 12.5 mms. The coupling occurs as usual from a wave guide H via an adjustable iris I. That is to say, a first microwave frequency is guided by wave guide H from a first microwave generator (not shown) to the iris I and is coupled by the iris to the cavity R, in a completely conventional manner. As is also quite conventional, the iris opening is adjustable by means of any suitable element, such as the usual tuning screw arrangement to permit matching the wave guide to the cavity. By this coupling a polarization of the magnetic component of the microwave field perpendicular to the resonator axis is caused at the spot of the sample, i.e., in the center of the resonator within the helix. The opening in the top of cavity R allows the tube containing the sample under test to be introduced into the cavity and inserted into the helix W. In addition, as is well known, such an opening acts as a high pass filter preventing microwave leakage from the cavity.

The arrangement of the helix W within the resonator is such that its axis and, thus, the direction of the magnetic component of the microwave field is perpendicular to the magnetic component of the microwave field of the resonator. The coupling of the helix from the wave guide H' takes place via an antenna A in door-knob coupling. That is to say, a second microwave frequency is guided by the wave guide H' from a second microwave generator (not shown) to the antenna A where it is coupled to the helix W. If the helix is to be used simultaneously as a HF coil, the radio frequency can be coupled to a coaxial line over a normal $\lambda/4$-choke D.

The orthogonality of the microwave fields necessary for the decoupling can, in principle, also be obtained with a rectangular resonator. In this case the helix axis has to be arranged parallel to the short side of the resonator.

The main advantage of the arrangement according to the invention is that the two microwave fields in the resonator and in the helix are decoupled from each other similar to a cross-coil type arrangement. A complete decoupling can be reached if the helix is arranged in such a manner that it can be tilted and shifted by about 1/20 of the length of the resonator. This shift should be perpendicular to its axis and parallel to the axis of the resonator. Another possibility for obtaining complete decoupling is to introduce dielectric sticks more or less deep into both halves of the resonator.

In the orthogonal arrangement of the cavity and the helix according to the invention, the sample is not shielded from the microwave field of the resonator; it rather permits the magnetic components of the microwave fields both of the resonator and of the helix to react unrestrictedly upon the sample. This characteristic is a necessary condition for the above-mentioned application.

Figure 3:
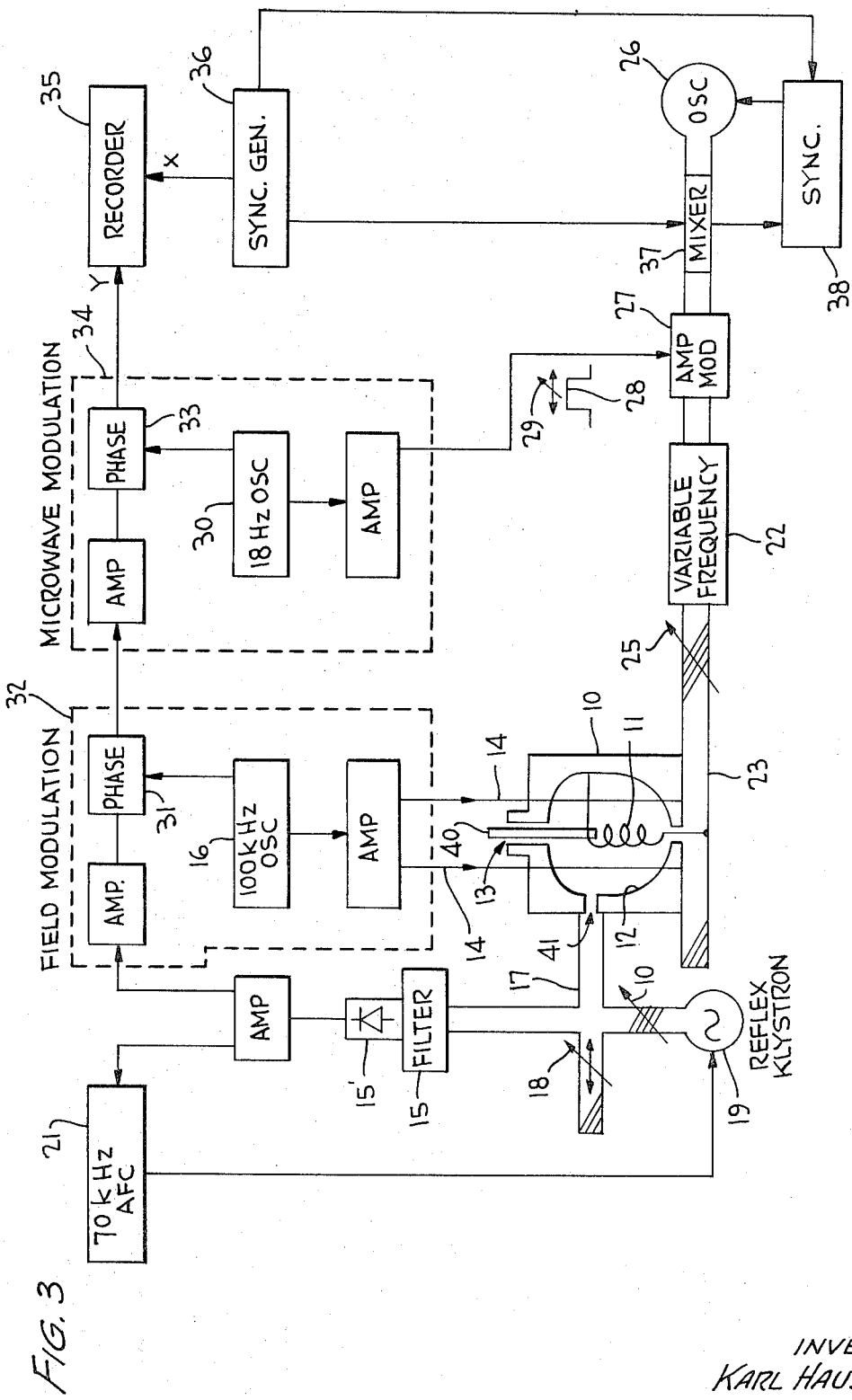
FIG. 3 is a block diagram arrangement of a spectrometer system embodiment of the invention.

As may be seen from FIG. 3 of the drawing, a microwave cavity of the type described is used in a bridge arrangement of a spectrometer system. The cavity is schematically shown at 10 with the helix 11 in cavity 12 having sample opening 13. Two modulating wires or probes 14, 14 extend into the cavity to provide the conventional ESR spectrometer 100 KH$_2$ field modulation as derived from oscillator 16. The corresponding phase sensitive rectification of the signals measured from cavity 12 takes place in filter 15 and diode 15' as received from signals at microwave waveguide 17, tunable at 18 and receiving energy from reflex klystron 19 which may be variably attenuated at 20 and frequency controlled by AFC circuits 21.

Pumping energy of a continuously varying frequency as designated at 22 is entered at waveguide 23 for coupling to helix 11 after attenuation at 25, to attain a maximum amplitude in the order of 10 watts as obtained from backward wave oscillator 26. The pumping frequency amplitude is modulated at 27 by a pin diode modulator with square waves 28 of variable duration, as shown by arrow 29, which are presented at a frequency of 18 Hz, as obtained from oscillator 30.

Corresponding phase sensitive processing equipment 31 processes the signals in field modulation section 32 in a phase comparison mode established in phase device 31 which relates the oscillations from oscillator 16 to the signals from diode 15'. This corresponds to the field modulation signals from oscillator 16 which are processed in cavity 12 by probes 14, 14 and detected or measured at output iris 41 of the cavity before processing in waveguide 17. The signals are further processed in phase sensitive block 33 of the microwave modulation section 34 to produce a Y axis signal on recorder 35, which is synchronized by sync generator 36 on the X axis. The sync generator also by means of mixer 37 and sync circuit 38 serves to control the phase of the backward wave oscillator 26 and to introduce into helix 11 a signal of known phase and of variable frequency. This oscillator 26 is then continuously variable by means of the variable frequency device 22. This is an important part of the arrangement since the broad band characteristics of the helix 11 do not require tuning of the cavity 12, which would be difficult for various signals because of the effect upon tuning for the frequency to be measured at waveguide 17 to which the cavity 12 is tuned by cavity dimensioning. Thus, the bridge arrangement with the helix arranged to produce the orthogonal magnetic field gives full signal coupling with proper shielding over a wide frequency spectrum of pumping frequencies without cavity tuning. In this respect, it is not feasible with known equipment in a tuned cavity to tune for one frequency independently of the effect on the other frequency so that a spectrometer providing the use of a variable pumping frequency without the necessity of tuning is an important part of the present contribution. Thus, the Electron Spin Resonance mode may occur with the helix as the transmitter and the resonating cavity as the receiver. In the spectrometer equipment the difference between the normal and double resonance is detected and the arrangement gives a direct proportional relationship to the electron-electron double resonance effect.

Figure 4:
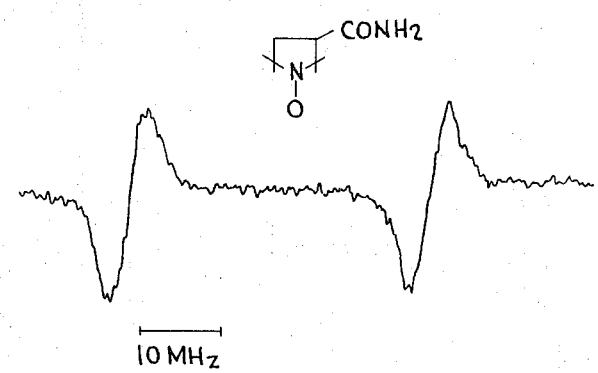
FIG. 4 is a typical wave diagram of an electron-electron double resonance spectrum attained in the system of FIG. 3.

As may be seen from the waveform diagram of FIG. 4, this arrangement may be used to measure the electron-electron spin resonance spectrum of free radicals in solutions such as a sample 40 introduced in the magnetic field of the helix. A representative display is shown of the electron-electron double resonance spectrum of 2, 2, 5, 5, Tetramethylpyrrolidine-3-carboxamide-1-oxyl in Benzol as obtained at room temperature. The measuring frequency of the cavity 11 is known, and the resonance frequency of the lower field component of the HFS-Tripletts may be established by a constant magnetic field while the pumping frequency at the helix 11 is continuously varied by means 22.

In this mode even at room temperature a good signal to noise ratio is obtained so that it is not necessary in the usual manner to attain a temperature of 80°C below ambient. This permits biological samples to be observed that must remain at ambient temperature. Also the bridge arrangement permits measurements of electron nuclear double resonance, electron electron nuclear triple resonance and dynamic nuclear polarization with similar spectrometer arrangements.

The apparatus herein described is described in an article entitled "Elektron-Elektron-Doppelresonanz mit Hilfe einer neuartigen Mikrowellen-Brueck5en-Anordnuug," coarthored by the applicant and published in "Zeitschrift Fuer Naturforschung", volume 26a, No. 1,1971, based upon a paper submitted on Dec. 7, 1970.

What is claimed is:

1. Spectrometer apparatus for measuring electron spin resonances comprising microwave bridge means including a microwave cavity tuned for resonance at a single frequency, a frequency independent helix extending into said cavity with an axis oriented relative to the mode of excitation of said cavity such that the magnetic components of the microwave fields of said cavity and said helix are orthogonal to produce substantially complete decoupling of said fields, means connected to said bridge means for supplying microwave energy at a fixed frequency into said cavity to induce oscillations therein in the resonant mode of the cavity, means providing continuously variable frequency microwave energy to said helix, a sample disposed within the helix to be excited at the same time by the two orthogonal fields of said fixed frequency energy and variable frequency energy and means connected to said bridge means and to said means providing continuously variable frequency microwave energy for measuring the absorption of said fixed and variable frequency energy by said sample.

2. Apparatus as defined in claim 1 including means amplitude modulating the microwave energy supplied to said helix.

3. Apparatus as defined in claim 1 wherein said means for measuring includes a recorder and means driving the recorder with a signal derived from the cavity.

4. Apparatus as defined in claim 3 including phase sensitive means processing the signal derived from the cavity in a phase comparison mode related to the microwave energy inducing oscillations in said cavity.

5. Apparatus as defined in claim 3 including means amplitude modulating with a known frequency signal the microwave energy supplied to the helix, and including phase sensitive means processing the signal derived from said cavity in a phase comparison mode related to said known frequency signal.

6. Apparatus as defined in claim 3 wherein the signals amplitude modulating the microwave energy supplied to said helix comprise square waves of a variable duration.

7. Apparatus as defined in claim 3 including means for operating the recorder to display the electron-electron spin double resonance spectrum with the variable frequency and the pumping frequency components set forth on orthogonal axes and amplitude modulating means for setting up a synchronous relationship between the variable frequency on one axis and the pumping frequency on the other axis.

* * * * *

UNITED STATES PATENT OFFICE
CERTIFICATE OF CORRECTION

Patent No. 3,798,532      Dated March 19, 1974

Inventor(s) Karl HAUSSER

It is certified that error appears in the above-identified patent and that said Letters Patent are hereby corrected as shown below:

Title page, in the heading, [30] Foreign Application Priority Data, the priority claim should appear as follows:

-- Mar. 5, 1968    Germany    P 16 98 223.3 --

Column 1, line 6, after "now abandoned" insert a comma (,); Column 1, line 21, "Wissenschaften" should read -- Wisschenschaften --; Column 1, line 24, before "resonance" insert -- a --. Column 4, lines 15 and 16, "Mikrowellen-Bruecken-Anordnuug" should read -- Mikrowellen-Brücken-Anordnuug --; Column 4, line 17, "Zeitschrift Fuer Naturforschung" should read -- "Zeitschrift Für Naturforschung" --; Column 4, line 64, claim 7, "pumping" should read -- fixed --; Column 4, line 68, claim 7, "pumping" should read -- fixed --.

Signed and sealed this 7th day of January 1975.

(SEAL)
Attest:

McCOY M. GIBSON JR.
Attesting Officer

C. MARSHALL DANN
Commissioner of Patents